United States Patent [19]
Fan et al.

[11] Patent Number: 5,789,512
[45] Date of Patent: Aug. 4, 1998

[54] METHOD FOR THE EPOXIDATION OF UNSATURATED POLYMERS

[75] Inventors: Mingxin Fan, Chester; Gary W. Ceska, Exton; James Horgan, West Chester, all of Pa.

[73] Assignee: Sartomer Company, Exton, Pa.

[21] Appl. No.: 772,313

[22] Filed: Dec. 23, 1996

[51] Int. Cl.$^6$ ......................................... C08F 8/08
[52] U.S. Cl. .................. 525/340; 515/332.8; 515/332.9; 515/333.1; 515/333.2
[58] Field of Search ................................. 525/340

[56] References Cited

U.S. PATENT DOCUMENTS 5,274,140  12/1993  Venturello et al. ............... 549/531

*Primary Examiner*—Bernard Lipman
*Attorney, Agent, or Firm*—Michael B. Fein

[57] ABSTRACT

A process for epoxidizing unsaturated polymers comprising reacting an unsaturated polymer with hydrogen peroxide in the presence of (a) tungstic acid or its metal salts, (b) phosphoric acid or its metal salts, and (c) at least one phase transfer catalyst.

16 Claims, No Drawings

METHOD FOR THE EPOXIDATION OF UNSATURATED POLYMERS

BACKGROUND OF THE INVENTION

1. Field of the Invention This invention relates to processes for epoxidation of unsaturated polymers.

2. Description of the Prior Art

Epoxidation of unsaturated polymers is well studied and has been reviewed (Rubber Chemistry and Technology, 1982, 55, 809). Epoxidation is widely used as a way to functionalize polymers by introducing oxirane groups which can be further converted. Peracides, particularly peracetic acid, have been used as the epoxidation agents. Peroxyformic acid has been used for the epoxidation of styrene-butadiene block copolymers (J. App. Pol. Sci. 1979, 23, 3301, & 3311). Similarly, cis-polyisoprene, butyl rubber, EPDM, and polybutadiene have been epoxidized (Polymer, 1983, 24, 107; J. Appl. Plym. Sci. Polm. Symp., 1977, 60, 47; Makromol. Chem., 1983, 184, 1153; Makromol. Chem., 1986, 187, 2761).

Recently, a variety of unsaturated polymers have been epoxidized with hydrogen peroxide in the presence of a quaternary ammonium tetrakis (diperoxotungsto) phosphate catalyst, (J. Poly. Sci. Part C: Polly. Lett. 1990, 28,285; J. Poly Sci.: Part A; Poly Chem. 1991,29,547). This process suffers from certain disadvantages, e.g., the catalyst is not readily available.

SUMMARY OF THE INVENTION

This invention relates to process for epoxidizing unsaturated polymers comprising reacting an unsaturated polymer or oligomer with hydrogen peroxide in the presence of (a) tungstic acid or its metal salts, (b) phosphoric acid or its metal salts, and (c) at least one phase transfer catalyst.

DETAILED DESCRIPTION OF THE INVENTION AND PREFERRED EMBODIMENTS

The term "polymers" as used herein includes polymers from the oligomeric range of about 500 to 5000 molecular weight to the high molecular weight polymers of above 5000.

Unsaturated polymers suitable for epoxidation are polybutadienes, polyisoprene, styrene-butadiene block copolymers, EPDM, butyl rubber, unsaturated polyesters, alkyds, vegetable oils such as, for example, soybean oil, linseed oil, verona oils and the like.

The method of the invention allows use of a low level of catalyst composition free of organic acid and/or peracid, resulting in simple product workup and process, and using readily available catalysts.

The process comprises use of hydrogen peroxide in the presence of (a) tungstic acid or its metal salts, (b) phosphoric acid or its metal salts, and (c) at least one phase transfer catalyst. The epoxidation of unsaturated polymers can be performed at any temperature which is sufficient to react. Particularly suitable temperatures are between 0° C. and 100° C., preferably from 25° C. to 70° C. The reaction takes place faster at higher temperature and requires shorter time to complete. The reaction is typically exothermic and so addition of hydrogen peroxide is preferred to control the exotherm. At higher temperatures hydrogen peroxide undergoes decomposition. The reaction can be performed at subatmospheric to superatmospheric pressures; however, the reaction is preferably carried out at atmospheric pressure.

The epoxidation can be performed with or without solvent. The use of solvent is preferred because it reduces the viscosity. If solvent is desired, a water immiscible organic solvent such as chlorinated hydrocarbons, and ethers, glycol ethers, hydrocarbons, and combinations thereof, are especially useful. Particularly suitable organic solvents are toluene, chlorobenzene, chloroform, methylene chloride, heptane, and the like.

Hydrogen peroxide solution is used as oxidant in a concentration in water of about 5 to 70% by weight. The amount of hydrogen peroxide can vary depending on the desired degree of epoxidation, typically about 0.1 to 1.5 equivalent per equivalent of unsaturated double bond.

The phase transfer catalyst can be used in amounts of about 0.001 to 1, preferably 0.05 to 0.1, equivalents per equivalent of carbon—carbon double bond. Suitable phase transfer catalysts includes quaternary ammonium salts, quaternary phosphonium salts, polyethers, and the like. Examples of phase transfer catalysts include, for example, trioctylmethylammonium chloride, trioctylmethylammonium bromide, trioctylmethylammonium iodide, trioctylmethylammonium hydrogen sulfate, trioctylmethylammonium nitrate, tetrahexylammonium chloride, tetrahexylammonium bromide, tetrahexylammonium iodide, tetrahexylammonium hydrogen sulfate, tetrahexylammonium nitrate, tetrabutylammonium chloride, tetrabutylammonium bromide, tetrabutylammonium nitrate, tetrabutylammonium hydrogen sulfate, dioctadecyldimethylammonium chloride, dioctadecyldimethylammonium bromide, dioctadecyldimethylammonium nitrate, dioctadecyldimethylammonium hydrogen sulfate, dihexadecyldimethylammonium chloride, dihexadecyldimethylammonium bromide, dihexadecyldimethylammonium nitrate, dihexadecyldimethylammonium hydrogen sulfate, trioctylmethylphosphonium chloride, trioctylmethylphosphonium bromide, trioctylmethylphosphonium nitrate, trioctylmethylphosphonium hydrogen sulfate, tetrahexylphosphonium chloride, tetrahexylphosphonium bromide, tetrahexylphosphonium nitrate, tetrahexylphosphonium hydrogen sulfate, tetrabutylphosphonium chloride, tetrabutylphosphonium bromide, tetrabutylphosphonium nitrate, tetrabutylphosphonium hydrogen sulfate, tetrabutylphosphonium iodide, dioctadecyldimethylphosphonium chloride, dioctadecyldimethylphosphonium bromide, dioctadecyldimethylphosphonium nitrate, dioctadecyldimethylphosphonium hydrogen sulfate, dihexadecyldimethylphosphonium chloride, dihexadecyldimethylphosphonium bromide, dihexadecyldimethylphosphonium nitrate, dihexadecyldimethylphosphonium hydrogen sulfate, tetraalkylammonium hydoxide, tetraalkylammonium tribromide, tetraalkylammonium trifluoromethanesulfonate, and any combination thereof.

Phosphoric acid or its various salts can be used in amounts of about 0.001 to 0.5 equivalents per equivalent of carbon—carbon double bond. Sodium or potassium salts of monobasic, dibasic, or tribasic phosphoric acid can also be used. The final pH can be adjusted by other acids or bases to about 0–5.

Either tungstic acid which is not water soluble or its metal salts which are soluble can be used as the metal catalyst. The typical catalyst is used in amounts of about 0.005 to 1%, based on weight of unsaturated compound. The preferred metal catalyst is tungstic acid.

The epoxidized unsaturated polymers produced by the process of the invention are conventional and can be used in applications such as coatings, epoxy/amine cure, cationic cure, and chemical intermediates for functionalizations.

EXAMPLES

The following non-limiting examples are presented to illustrate a few embodiments of the invention. All parts and percentages are by weight unless otherwise indicated.

Example 1
Epoxidation of Polybutadiene

The polybutadiene used in this example was of a polybutadiene homopolymer produced by Advanced Resins, Inc., molecular weight is 5500 g/mol, and 16–20% 1,2-unsaturation, 44% of trans-1,4-unsaturation and 36% of cis-1,4-unsaturation, referred to hereafter as Ricon 131.

0.17 g tungstic acid, 0.10 g phosphoric acid (85%), 67.0 ml hydrogen peroxide, 0.35 g trioctyl methyl ammonium chloride, 1,2-polybutadiene and 100 ml toluene were changed to a reactor which was equipped with mechanical stirrer, thermocouple, and condenser. The mixture was stirred and heated to 55° C. The reaction was shut down after 3½ hours at 55° C.

To the reaction mixture, 200 ml toluene and 100 ml of 20% sodium chloride were added and kept at 50°–55° C., which resulted in a two phase system. The aqueous phase was clear and the organic phase was cloudy. The organic phase was washed twice with 20% NaCl and solvent was removed at 90°–95° C. at 25–35 mm Hg. A light yellow liquid was obtained with epoxy value of 182.7 MgKOH/g and viscosity of 6000 cps at 25° C.

Example 2
Epoxidation of Polybutadiene

The polybutadiene used in this example was hydroxy terminated with molecular weight of 1100 g/mol, and 20% 1,2-unsaturation, 20% cis-1,4-unsaturation, 60% trans-1,4unsaturation, produced by Elf Atochem, referred to hereafter as Polybd-R-20LM.

212.6 g polybutadiene, 2.10 g 600 methyl ammonium chloride 600 ml toluene, 1.0 g tungstic acid, 0.25 mil phosphoric acid (85%), and 400 ml hydrogen peroxide (30%) were placed into a reactor which was equipped with a thermocouple, a mechanical stirrer and a condenser. The reaction mixture was stirred and heated to 60° C. Stirring was continued for 8.0 hours at 60° C. The reaction mixture was then allowed to separate into two phases. The organic phase was isolated and washed twice with 200 ml water. The solvent was removed under a reduced pressure of 25 mm Hg at 60° C. Viscous light yellow epoxidized polybutadien was obtained with viscosity of 85,400 cps at 25° C. and epoxy value of 183.3 mgKOH/g.

Example 3
Epoxidation of Polybutadiene

The polybutadiene used in this example was hydroxy terminated with molecular weight of 2800 g/mol, and 20% 1,2-unsaturation, 20% cis-1,4-unsaturation, 60% trans-1,4unsaturation, referred to as Polybd-45HT, produced by Elf Atochem.

Polybutadiene (110.2 g), toluene (200 ml), (methyl ammonium chloride 1.0 g), tungstic acid (0.34 g), phosphoric acid (85%, 0.38 g), hydrogen peroxide (30%, 50 ml), were charged to a reactor which was equipped with a thermocouple, a mechanical stirrer, and a condenser. The mixture was stirred and heated to 60° C. The reaction was stopped after 4.0 hours at 60° C. The organic phase was isolated and washed with 100 ml water. A clear, yellow viscous material was obtained after solvent removal under reduced pressure at 75° C.

Final product physical properties: color G5; 4187 cps viscosity at 65°; Epoxy value of 172.8 mgKOH/g.

While the invention has been described in sufficient detail for those skilled in the art to make and use it, various modifications, alternatives, and improvements should become readily apparent without departing from the spirit and scope of the invention as set forth in the following claims.

What is claimed is:

1. A process for epoxidizing unsaturated polymers comprising reacting an unsaturated polymer or oligomer with hydrogen peroxide in the presence of (a) tungstic acid or its metal salts, (b) phosphoric acid or its metal salts, and (c) at least one phase transfer catalyst.

2. Process according to claim 1 wherein said unsaturated polymer is selected from the group consisting of polybutadienes, polyisoprene, styrene-butadiene block copolymers, EPDM, butyl rubber, unsaturated polyesters, vegetable oils and alkyds.

3. Process according to claim 1 wherein said hydrogen peroxide is introduced in an amount of about 0.1 to 1.5 equivalent per equivalent of unsaturated double bond.

4. Process according to claim 1 wherein the reacting is conducted at a temperature of about 0° C. to 100° C.

5. Process according to claim 1 wherein the reacting is conducted at a temperature of about 25° C. to 70° C.

6. Process according to claim 1 wherein the phase transfer catalyst is present in an amount of about 0.001 to 1 equivalents per equivalent of carbon—carbon double bond in the unsaturated polymer or oligomer.

7. Process according to claim 1 wherein the phase transfer catalyst is present in an amount of about 0.05 to 0.1 equivalents per equivalent of carbon—carbon double bond in the unsaturated polymer or oligomer.

8. Process according to claim 1 wherein the phase transfer catalyst is selected from the group consisting of quaternary ammonium salts, quaternary phosphonium salts, and polyethers.

9. Process according to claim 1 wherein the reaction is conducted in the presence of a water-immiscible organic solvent.

10. Process according to claim 1 wherein the reaction is conducted in the presence of a water immiscible organic solvent selected from the group consisting of chlorinated hydrocarbons, ethers, glycol ethers, hydrocarbons, combinations thereof.

11. Process according to claim 10 wherein the solvent is selected from the group consisting of toluene, chlorobenzene, chloroform, and methylene chloride.

12. Process according to claim 1 wherein the phosphoric acid or phosphoric acid salt comprises about 0.001 to 0.5 equivalents per equivalent of carbon—carbon double bond of the unsaturated polymer or oligomer.

13. Process according to claim 1 wherein the phosphoric acid or salt thereof is a sodium or potassium salt of monobasic, dibasic, or tribasic phosphoric acid.

14. Process according to claim 1 wherein the pH of the reaction is adjusted by acids or bases to about 0–5.

15. Process according to claim 1 wherein the tungstic acid or salts thereof is tungstic acid.

16. Process according to claim 1 wherein the tungstic acid or salts thereof is present in and amount of about 0.005 to 1% based on weight of unsaturated compound.

* * * * *